Patented Feb. 28, 1939

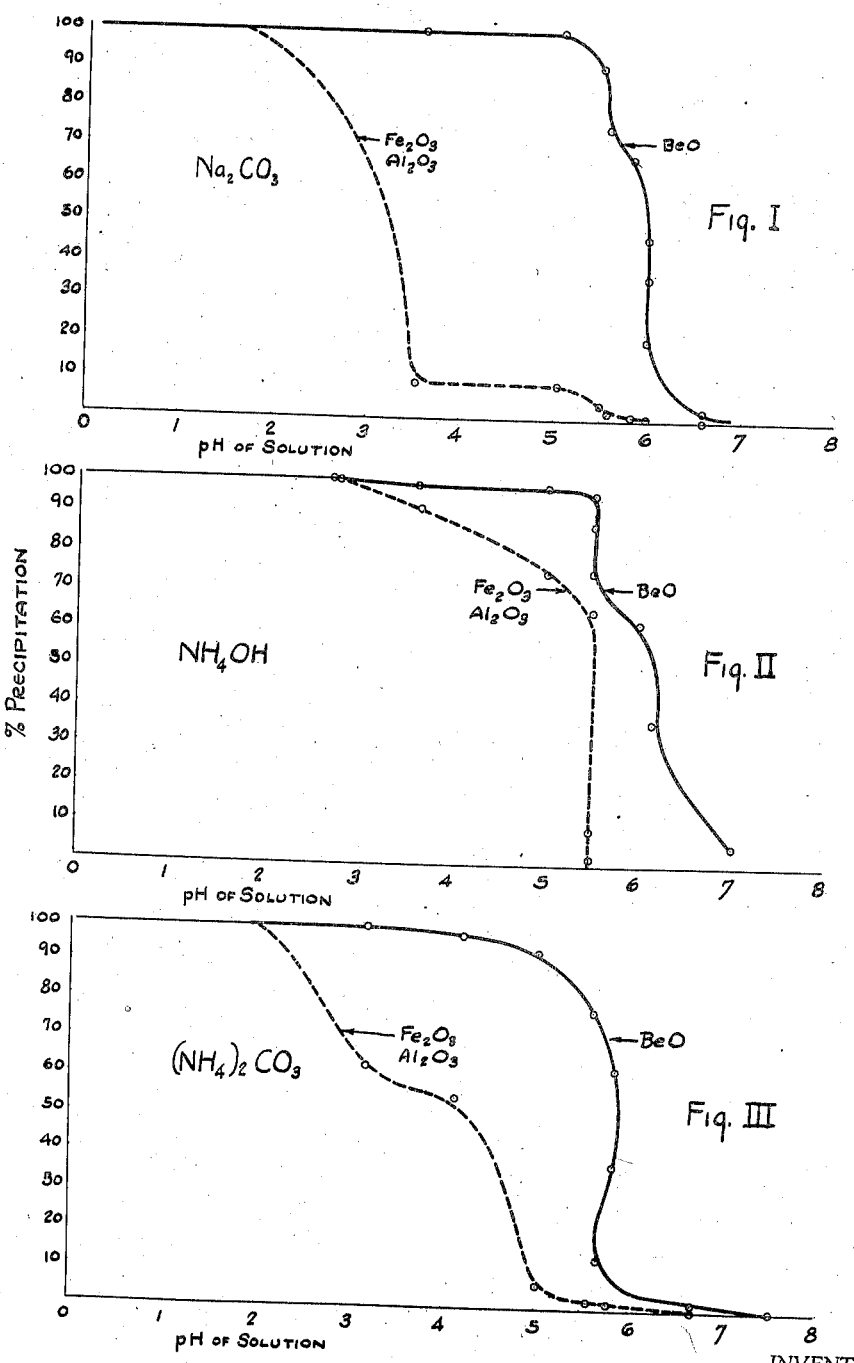

2,148,520

UNITED STATES PATENT OFFICE 2,148,520

METHOD OF MAKING BERYLLIUM OXIDE

Robert E. Windecker, Painesville, Ohio

Application May 12, 1937, Serial No. 142,136

4 Claims. (Cl. 23—23)

This invention relates to recovery of beryllium from its ore and has particular reference to that part of the process which comprises producing beryllium oxide from a solution containing the sulfates of beryllium and other metals occurring therewith in the mineral, beryl. In its broadest aspect, the invention contemplates separation of beryllium from any, some or all of the metals which occur with it in beryl and other beryllium ores or similar mixtures, starting with an acid solution of such metals and finally producing a beryllium compound of such purity as to be useful in metallurgy.

This application is a continuation in part of my copending application Serial No. 94,575, filed August 6, 1936.

In the accompanying drawing, Fig. 1 is a diagram illustrating tests wherein $Na_2CO_3$ in 10% aqueous solution was used as the precipitant and wherein percentage precipitation is plotted as ordinates against pH value of the solution as abscissae. The solution contained the sulfates of beryllium, aluminum and iron in about the relative proportions in which they occur in beryl, and in a concentration of about 6 grams metals per liter of solution, oxide basis; Fig. 2 is a similar diagram illustrating the use of similarly dilute $NH_4OH$ solution as a precipitant in the case of a solution like that of Fig. 1; and Fig. 3 is a similar diagram illustrating the use of a similar solution of $(NH_4)_2CO_3$ as precipitant under otherwise similar conditions to those of Fig. 1.

For convenience, I will describe the successive steps of a complete process, successively, indicating the optional steps as such and describing illustrative variations in the performance of each step in connection therewith. It will be understood that separations may be made using various solutions as raw materials, and that sub-combinations of the steps and parts of steps described may be appropriate for such solutions.

First step

Prepare from beryl or similar ore an aqueous solution substantially free of silica containing a mixture of sulfates of beryllium aluminum and the heavy metals occurring therewith in beryl or similar ore or mixtures. This solution may be prepared in any well known manner and may contain any desirable quantity of materials in proportion to give a specific gravity of about 1.39 at 75° F. The solution will contain principally beryllium, aluminum and iron sulfates in which the iron is preferably in the ferric state. Small quantities of heavy metal sulfates other than iron may be present. All these sulfates, other than that of beryllium and aluminum, are, for the purposes of this specification termed heavy metal sulfates, the metals combined therewith being termed heavy metals.

Second step

Remove a major portion of the aluminum sulfate by adding to a concentrated solution a quantity of an alkali sulfate, preferably ammonium sulfate, whereby to form an alum which crystallizes out of solution and may be readily removed. The amount of alkali sulfate added should be not greater and preferably should be less than the amount required theoretically to combine with the aluminum sulfate to form alum whereby the remaining liquor will differ from the original solution substantially only in that the quantity of aluminum sulfate will be greatly reduced. Should an excess of alkali sulfate be added and the solution concentrated too much, a material quantity of beryllium would be crystallized with the alum, a result which would be undesirable since this process does not contemplate recovering beryllium from the alum. This step is optional and may be omitted.

Third step

Add slowly and with rapid agitation to the diluted solution a suitable quantity of a dilute aqueous solution of an alkali such as sodium or potassium carbonate or hydroxide, ammonium carbonate or hydroxide, barium hydroxide or the like; boil and filter. Precipitating characteristics of three of these, indicated by suitable legends, are indicated in the drawing. The quantity of alkali added is of great importance and constitutes the principal feature of the invention. I have discovered that the pH value of the solution is the most reliable measure of the proper quantity of alkali to add. It has proved reliable for the treatment of solutions prepared from ores from various sources and in spite of the variations in conditions which necessarily occur in practice. I prefer to raise the pH value gradually to a point at which most of the aluminum and heavy metals are precipitated in the form of the carbonate or the hydroxide. It will be noted that the three precipitants $Na_2CO_3$, $NH_4OH$ and $(NH_4)_2CO_3$ have the common property of precipitating substantially all the iron and aluminum at a pH value of 5.5 and that without undue loss of beryllium the pH value may be permitted to go a little beyond 5.5. In the case of $Na_2CO_3$ it may go to 5.8 or even to 5.9 although the loss of beryllium increases rapidly and the pH value should be kept below 5.7. In the case of NH4OH, 5.5 to 5.7 is preferable but a pH value as high as 6.0 does not result in prohibitive loss of beryllium. In the case of ammonium carbonate as well as the other alkalis mentioned above, a value of 5.5 to 5.7 is satisfactory.

In addition to the common properties, NH4OH possesses the further important property of precipitating all the iron and aluminum (down to a negligible amount) at 5.5. This property combined with the volatility of ammonium sulfate whereby it can be readily removed from the beryllium precipitate, makes it the best precipitant for separation of practically all aluminum and iron from the beryllium. It is especially useful for final precipitation after the bulk of the aluminum and iron has been removed, and the beryllium precipitated, and redissolved, in sulfuric acid.

In addition to the common properties Na2CO3 possesses the further important property of precipitating the bulk of iron and aluminum, down to about 10% at a very considerably lower pH value as shown in Fig. 1, which is a point far below that at which beryllium begins to precipitate. Thus, without the need for nice control, a major portion of aluminum and iron can be removed without any loss of beryllium, after which NH4OH can be used for removal of the last 10% or thereabout. In such case the precipitate containing the last fraction of aluminum and iron and perhaps 25% of the beryllium can be reworked more easily than if it contained all the aluminum and iron. Thus, the treatment with Na2CO3 sufficient to produce a pH value of 3.6 to 5.1, preferably from 4.0 to 5.0 may be regarded as a substitute for the "Second step" treatment.

The above determinations were made, using standard calometric methods and indicators suited to the pH ranges wherein they are employed, as follows:

pH 3.8–5.4, bromcresol green,
pH 4.4–6.0, methyl red,
pH 6.0–7.6, bromthymol blue,
pH 7.2–8.8, cresol red.

Preferably, instead of adding all the alkali at one precipitation, I add it in steps, boiling and filtering at each step. For example, I may add sufficient alkali to the solution to produce a pH value of 4.3, boil and filter; then add alkali to produce a pH value of 4.8, boil and filter; and, finally, add alkali to produce a pH value of 5.5 to 5.7, boil and filter. Preferably the dilution of the alkali solution which is added is increased, as the final pH value is approached, so as to obtain a sharper control of the final end point. The process is not limited to exact pH values since these values are varied by soluble salt concentrations, and the like. Where such influences are present, the critical pH values obviously can be readily determined for that particular solution. Accordingly the figures given are not to be read in a limiting sense but as indicative of critical pH values which may vary somewhat (one or two tenths) but which can be readily established for a given solution. This separation in steps is desirable since it reduces the amount of beryllium carried down with the precipitate of aluminum and heavy metals. It is not, however, essential, and good results are obtainable by a single precipitation only, especially if a large part of the aluminum has been removed as alum in Step two or by treatment with Na2CO3.

Addition of the alkali with agitation and in dilute solution (preferably 10% to 3%) both contribute to elimination of localized portions of excessive alkalinity. This and equivalent modes of addition may be termed "diffuse". Boiling, although done for the primary purpose of rendering the gelatinous precipitate granular for more ready filtration, serves the further purpose of reducing the amount of beryllium in the precipitate, apparently causing some of the beryllium to redissolve in the form of the sulfate and precipitating correspondingly aluminum and the heavy metals.

When this (third) step is carried out in e. g. two precipitations, the first fraction of the precipitate may be relatively rich in iron and poor in both aluminum and beryllium while the last fraction has less iron but is rich in aluminum and contains a major portion of the beryllium which is carried down. The first fraction may be discarded. The precipitate or precipitates obtained up to pH 5.5–5.7 may be redissolved and separately treated according to the Second or Third step and the resulting liquor added to a succeeding main batch or portion of liquor from the First or Second step treatment, and, with the same, undergo treatment according to the subsequent steps. Alternatively, these precipitates may be redissolved and added to the main portions of material about to undergo treatment according to the Second or Third step.

*Fourth step*

The liquor from the Third step contains substantially only beryllium sulfate and alkali sulfate. By addition of a further quantity of an alkali whose sulfate is soluble, the beryllium is precipitated and removed, after boiling, by filtering. This precipitate may then be dried and calcined to the oxide or redissolved and retreated according to Step three and arriving at the pH value of 5.5–5.7 in one precipitation using preferably aqua or carbonate of ammonia. Thus an oxide of greater than 99% purity may be obtained. The quantity of alkali added should be such as to precipitate practically all the beryllium.

*Fifth step*

The precipitate from the Third step (or such of it as may be retained where a first fraction is discarded) may be treated with a suitable acid, preferably sulfuric, whereby to reconvert the mixture of precipitated metals to the sulfates. The resulting solution will be rich in aluminum sulfate, particularly where "Step two" has been omitted and will lend itself admirably to removal of most of the aluminum by the procedure described under "Second step". Practically none of the beryllium will be removed with the alum. The liquor from such treatment may be then treated according to the third and subsequent steps, but, preferably is simply added to a succeeding portion about to undergo Third step treatment whereby the process may become a continuous one with such portion of the beryllium as is carried down by the Third step treatment being returned continuously to that treatment; aluminum being continuously removed as crystal alum at the Second step; and iron being continuously removed and discarded, with a portion of the aluminum, in the first fraction of the Third step. The alum may be sold as such or broken down to produce ammonium sulfate for reuse in the process. Since under optimum conditions the iron precipitates first and is practically all precipitated along with some aluminum when the pH values 4.0–4.5 are reached, the following fraction up to about 5.4–5.5 is very rich in aluminum and may be separated and marketed as purified alumina. In this way the process may produce aluminum as alum and as aluminum oxide.

I have described above a complete process for treating the mixture of sulfates produced by leaching beryl. It is to be understood that some of the steps are optional for that purpose, as indicated, and unnecessary when the mixtures to be treated do not contain all the metals occurring in beryl or contain them in substantially different proportions. Accordingly, various sub-combinations of steps and parts of steps are within the scope of my invention and I do not wish to be limited to the use of all the steps disclosed.

*Example*

A solution of the sulfates of Be, Al and heavy metals obtained from leaching treated beryl and containing about 29.2 lbs. $Al_2O_3$ and heavy metals and about 21.6 lbs. BeO also containing sodium or other soluble sulfate and a small excess of sulfuric acid was concentrated to approximately 1.39 sp. gr. at 75° F. This concentration is not sharply critical although there appears to be a definite optimum concentration for each batch. This optimum varies with the method of preparing the sulfate solution, the source of the ore, and the quantity of soluble sulfates, excess free acid and other impurities present. I am unable to define precisely what this concentration should be for all cases but the optimum may be readily determined by practical tests. If the concentration is too low the yield of alum will be reduced; if too high beryllium will be crystallized with the alum. The precise optimum will therefore be determined by cost considerations. To this concentrated solution was added about 36 lbs. of ammonium sulfate as a saturated solution. The solution was allowed to stand and to cool to normal room temperature (about 75° F.) and the alum crystals filtered from the solution. In this batch approximately 80% of the alumina was removed from the solution as alum.

The mother liquor from the alum crystallization was then diluted with water to about 400 gal. of solution. To this solution a dilute sodium carbonate solution was added slowly with agitation until a boiled sample gave a pH value of approximately 5.5. The solution was then boiled for about 30 minutes, allowed to cool, and filtered.

The precipitate thus obtained contained approximately all of the remaining alumina and heavy metals and about 12% of the BeO. The solution from this precipitation was then treated with additional sodium carbonate solution until a test sample showed no further appreciable precipitation of beryllium. The solution was then boiled for about 30 minutes and filtered while still hot. The beryllium precipitate was washed and dried. This precipitate contained about 85% of all the beryllium in the original solution and was of about 97% purity.

Beryllium oxide of approximately 99.8% purity is obtained by redissolving the 97% beryllium oxide in sulfuric acid, diluting as in Step three and adding an alkali, preferably ammonia, to a pH value of 5.5–5.7 to precipitate the remaining impurities from the beryllium sulfate solution. This precipitate is then filtered off and the beryllium precipitated by further addition of ammonia.

In the above example, the precipitate obtained by the addition of alkali up to pH 5.5–5.7 may be returned into the process at Step one and a large proportion of the beryllium contained therein may be recovered.

At the pH value, in the treatment illustrated in Fig. 2, of 5.0 the actual quantity of impurities was only 1.2%. In such a case it would be advisable to effect a separation of the components at this point to avoid further loss of Be to the alumina precipitate, if the solution contains non-volatile ions other than Be and Al such as sodium, in which case, to produce an alkali free product, the precipitate of beryllium is redissolved, diluted and treated with aqua ammonia or carbonate of ammonia. During this treatment the small remainder of 1.2% of alumina may readily be reduced to practically zero.

It is therefore clear that a first crude separation may be made at a lower value than 5.5, say 5.0–5.3, with only a very slight loss of beryllium to the iron-aluminum precipitates and that by resolution and reprecipitation at about 5.5–5.7 a very pure beryllium oxide may be obtained and the losses to the iron-alumina precipitates reduced to such an extent as to eliminate the necessity of reworking such precipitates, thus effecting considerable economy.

In this process the purity of the beryllium precipitate obtained in the Fourth step may be increased to above 97% by carrying the pH value slightly higher than 5.7 with a corresponding loss of beryllium into the alumina precipitate to be reprocessed. The process may be varied to obtain different purities of beryllium oxide, depending on the purities found necessary for reducing the oxide to the metal and the economies of the process.

Having thus described my invention, what I claim is:

1. Process of recovering beryllium from an acid solution containing a mixture of the sulfates of beryllium and one or more of the other metals including aluminum occurring in the mineral, beryl, including, removing a major portion but not all of the aluminum by treating the solution with ammonium sulfate in quantity to crystallize as alum a major portion of, but not all of the aluminum, raising the pH value of the solution to but not substantially beyond the range of from 5.5 to 5.7 by diffuse addition of an alkali capable of removing the sulfate ions from said other metals and forming insoluble compounds thereof, heating and removing the precipitate thus formed from the reaction mixture.

2. The process of recovering beryllium from an acid solution containing a mixture of the sulfates of beryllium, aluminum and iron, including the steps of removing a major portion but not all of the aluminum by treating the concentrated solution with ammonium sulfate in quantity to crystallize as alum a major portion of but not all of the aluminum, adding water to the resulting liquor to produce a relatively dilute solution with respect to BeO and adding diffusely a dilute sodium carbonate solution to a pH value of approximately 4.0 to 5.0, but not substantially beyond 5.0, thus precipitating aluminum and iron, then heating and removing the aluminum and iron precipitates from the solution, adding further sodium carbonate solution and precipitating beryllium with the remaining metal content, filtering this last beryllium precipitate and redissolving in sulfuric acid, diluting as in the original dilute solution and adding a precipitant from the group consisting of ammonia carbonate, ammonia hydroxide and mixtures thereof to a pH value of approximately 5.5 to 5.7, but not substantially beyond 5.7, heating the solution, removing the precipitate containing aluminum, then continuing the addition of a precipitant until the pure beryllium is precipitated.

3. Process of recovering beryllium from an acid solution containing a mixture of the sulfates of beryllium and one or more of the other metals including aluminum occurring in beryl, including the steps of removing a major portion but not all of the aluminum by treating the concentrated solution with ammonium sulfate in quantity to crystallize as alum a major portion but not all of the aluminum, diluting the resulting liquor and adding diffusely a dilute sodium carbonate solution to a pH value of approximately 4.0 to 5.0, but not substantially beyond 5.0, removing the precipitate, precipitating and removing the beryllium content together with the remaining metal content, redissolving the last precipitate in sulfuric acid, diluting and adding a precipitant from the group consisting of ammonium carbonate, ammonium hydroxide and mixtures thereof to a pH value of approximately 5.5 to 5.7, but not substantially beyond 5.7, heating the solution, removing the precipitate and then continuing the addition of the precipitant until the pure beryllium is precipitated.

4. Process of recovering beryllium from an acid solution containing a mixture of the sulfates of beryllium and one or more of the other metals including aluminum occurring in beryl, including the steps of removing a major portion but not all of the aluminum by treating the concentrated solution with ammonium sulfate in quantity to crystallize as alum a major portion but not all of the aluminum, adding water to the resulting liquor to produce a relatively dilute solution with respect to BeO, and adding diffusely a dilute sodium carbonate solution to a pH value of approximately 4.0 to 5.0, but not substantially beyond 5.0, removing the precipitate, precipitating and removing the beryllium content together with the remaining metal content, redissolving the last precipitate in sulfuric acid, diluting and adding a precipitant from the group consisting of ammonium carbonate, ammonium hydroxide and mixtures thereof to a pH value of approximately 5.5 to 5.7, but not substantially beyond 5.7, heating the solution, removing the precipitate thus formed and then continuing the addition of the precipitant until the pure beryllium is precipitated.

ROBERT E. WINDECKER.